US012742933B2

(12) United States Patent
Shi et al.

(10) Patent No.: US 12,742,933 B2
(45) Date of Patent: Sep. 22, 2026

(54) MODE SCRAMBLER

(71) Applicant: WUHAN RAYCUS FIBER LASER TECHNOLOGIES CO., LTD., Wuhan (CN)

(72) Inventors: Jixin Shi, Wuhan (CN); Yang Liu, Wuhan (CN); Liang He, Wuhan (CN); Dapeng Yan, Wuhan (CN)

(73) Assignee: WUHAN RAYCUS FIBER LASER TECHNOLOGIES CO., LTD., Wuhan (CN)

( * ) Notice: Subject to any disclaimer, the term of this patent is extended or adjusted under 35 U.S.C. 154(b) by 281 days.

(21) Appl. No.: 18/740,836

(22) Filed: Jun. 12, 2024

(65) Prior Publication Data

US 2024/0329314 A1 Oct. 3, 2024

Related U.S. Application Data

(63) Continuation of application No. PCT/CN2023/130552, filed on Nov. 8, 2023.

(30) Foreign Application Priority Data

Dec. 23, 2022 (CN) ........................ 202211659753.4

(51) Int. Cl.
*G02B 6/26* (2006.01)

(52) U.S. Cl.
CPC .................................. *G02B 6/268* (2013.01)

(58) Field of Classification Search
CPC ..................................................... G02B 6/268
See application file for complete search history.

(56) References Cited

U.S. PATENT DOCUMENTS

2004/0208437 A1* 10/2004 Pacheco ................. G02B 6/421 385/48
2008/0205477 A1* 8/2008 Hama .................. A61B 1/0638 359/332

(Continued)

FOREIGN PATENT DOCUMENTS

CN 101733545 A 6/2010
CN 210897960 U 6/2020

(Continued)

OTHER PUBLICATIONS

Notification to Grant Patent Right for Invention issued in counterpart Chinese Patent Application No. 202211659753.4, dated Feb. 1, 2023.

(Continued)

*Primary Examiner* — Chris H Chu
(74) *Attorney, Agent, or Firm* — Westbridge IP LLC

(57) ABSTRACT

Disclosed is a mode scrambler. The mode scrambler includes a fastening connection component, a first translation plate and a second translation plate. The fastening connection component is provided with an L-shaped groove for placing an optical fiber. The first translation plate and the second translation plate are both connected to the fastening connection component, the first translation plate is configured to reciprocate relatively to the fastening connection component along a radial direction of the optical fiber, and the second translation plate is configured to reciprocate relatively to the fastening connection component in a vertical direction. The second translation plate is abutted against a top of the optical fiber and is in close contact with a part of the sinusoidal surface of the first translation plate. The optical fiber is enclosed among the fastening connection component, the first translation plate and the second translation plate.

10 Claims, 4 Drawing Sheets

(56) References Cited

U.S. PATENT DOCUMENTS

| | | | | |
|---|---|---|---|---|
| 2009/0103865 | A1* | 4/2009 | Del Rosso | G02B 6/4202 385/32 |
| 2010/0290738 | A1 | 11/2010 | Yan et al. | |
| 2018/0341053 | A1* | 11/2018 | Brune | H01S 3/005 |

FOREIGN PATENT DOCUMENTS

| | | | | |
|---|---|---|---|---|
| CN | 112713492 | A | 4/2021 | |
| CN | 213903888 | U | 8/2021 | |
| CN | 216210128 | U | 4/2022 | |
| CN | 216817083 | U | 6/2022 | |
| CN | 115629470 | A | 1/2023 | |
| DE | 3405573 | A1 | 8/1985 | |
| JP | 2017151343 | A | 8/2017 | |
| JP | 2018194789 | A | 12/2018 | |
| WO | WO-2010055709 | A1 * | 5/2010 | G02B 6/2852 |
| WO | 2017134194 | A1 | 8/2017 | |

OTHER PUBLICATIONS

International Search Report and Written Opinion issued in corresponding PCT Application No. PCT/CN2023/130552, dated Dec. 11, 2023.

* cited by examiner

MODE SCRAMBLER

CROSS-REFERENCE TO RELATED APPLICATIONS

The present application is a continuation application of International Application No. PCT/CN2023/130552, filed on Nov. 8, 2023, which claims priority to Chinese Patent Application No. 202211659753.4, filed on Dec. 23, 2022. The disclosures of the above-mentioned applications are incorporated herein by reference in their entireties.

TECHNICAL FIELD

The present application relates to the technical field of optical fibers, and in particular, to a mode scrambler.

BACKGROUND

According to optical fiber coupling theory, macro-bending of the optical fiber causes internal modes to couple with each other. Based on this principle, a mechanical mode scrambler is designed to fully bend the optical fiber, thereby improving the output field distribution of the fiber. By compressing the optical fiber with the mode scrambler, the laser can achieve an appropriate beam quality. Since conventional metal compression directly on the fiber can cause damage, a rubber sleeve is needed at the point where the fiber is compressed. Because the inner diameter of the rubber sleeve is larger than the outer diameter of the fiber, the fiber has no displacement constraint in the radial direction within the rubber sleeve, making the beam quality after compression uncontrollable.

SUMMARY

In view of the shortcomings of the prior art, The main purpose of the present application is to provide a mode scrambler. In addition to compressing the optical fiber in the direction of mode scrambling, the mode scrambler also compresses the rubber sleeve in the perpendicular direction to the fiber compression direction. This limits the displacement of the fiber. By adjusting the slight compression in both directions, the deformation of the fiber after passing through the mode scrambler can be controlled, thus achieving an appropriate beam quality.

In order to achieve the above purpose, the present application provides a mode scrambler including a fastening connection component; a first translation plate; and a second translation plate.

The fastening connection component is provided with an L-shaped groove for placing an optical fiber; a vertical surface of the L-shaped groove is a sinusoidal surface, and the sinusoidal surface is provided along a length direction of the optical fiber.

The first translation plate and the second translation plate are both connected to the fastening connection component; the first translation plate is configured to reciprocate relatively to the fastening connection component along a radial direction of the optical fiber, and the second translation plate is configured to reciprocate relatively to the fastening connection component in a vertical direction.

A surface of the first translation plate contacting the optical fiber is a sinusoidal surface, and the sinusoidal surface of the first translation plate and the sinusoidal surface of the L-shaped groove are provided on two opposite sides of the optical fiber.

The second translation plate is abutted against a top of the optical fiber and is in close contact with a part of the sinusoidal surface of the first translation plate.

The optical fiber is enclosed among the fastening connection component, the first translation plate and the second translation plate.

In an embodiment, the first translation plate is connected to the fastening connection component through a first adjustment member, and the first adjustment member is provided on a bottom of the fastening connection component or a side surface of the fastening connection component.

In an embodiment, a threaded hole is provided on the side surface of the fastening connection component, the first adjustment member is a jackscrew, and the jackscrew is threadedly connected to the threaded hole and abutted against the first translation plate.

In an embodiment, the mode scrambler further includes a limiting plate provided on the fastening connection component and pressed above the first translation plate.

In an embodiment, the fastening connection component includes a connection assembly and a support plate provided on the connection assembly.

The support plate and the first translation plate are provided on two opposite sides of the optical fiber; a surface of the support plate contacting the optical fiber is the sinusoidal surface, and the L-shaped groove is formed between the support plate and the connection assembly.

The second translation plate is provided above the support plate, and the support plate is configured to drive the second translation plate to reciprocate in the vertical direction.

In an embodiment, the second translation plate is provided with an adjustment hole; the second translation plate is configured to reciprocate along the radial direction of the optical fiber in a horizontal plane through the adjustment hole, and the second translation plate is tightly connected to the support plate through a fastener passing through the adjustment hole.

In an embodiment, the adjustment hole is a strip hole, a long axis of the strip hole is provided along the radial direction of the optical fiber, and the fastener is configured to pass through the strip hole to tightly connect to the support plate.

In an embodiment, the connection assembly includes a first connection plate and a second connection plate, and the first connection plate and the second connection plate are connected to form a groove.

The second connection plate includes a second bottom plate portion, and the support plate is provided in the groove and above a bottom of the first connection plate; a part of a side surface of the second bottom plate portion is in contact with a side surface of the support plate to form the L-shaped groove.

In an embodiment, the first connection plate includes a first bottom plate portion and a first side plate portion, and the first bottom plate portion and the first side plate portion are connected to each other to form an L shape; the first bottom plate portion is provided below the second connection plate; the support plate is provided above the first bottom plate portion, and the other side surface of the support plate is in contact with an inner side of the first side plate portion.

In an embodiment, the second connection plate further includes a U-shaped side plate portion connected to the second bottom plate portion, and the first side plate portion is tightly connected to the U-shaped side plate portion to form a side wall of the groove; the first translation plate is provided above the second bottom plate portion, and the limiting plate is tightly connected to the U-shaped side plate portion.

Compared to the prior art, the present application has the following beneficial effects.

In the present application, an L-shaped groove is provided on the fastening connection component for placing the optical fiber. The vertical surface of the L-shaped groove is a sinusoidal surface, and the surface of the first translation plate that contacts the optical fiber is also a sinusoidal surface. These surfaces act on both sides of the optical fiber, and the first translation plate moves radially to clamp the fiber. Under the combined action of the L-shaped groove and the first translation plate, the optical fiber undergoes sinusoidal deformation when clamped, which ensures that during mass production of lasers, the beam emitted by the laser remains controlled within the same range and maintains consistency after the optical fiber is clamped by the mode scrambler.

Additionally, the second translation plate is connected to the fastening connection component. The second translation plate is in contact with a part of the sinusoidal surface of the first translation plate. The second translation plate presses against the top of the optical fiber. At this point, the first translation plate, the second translation plate, and the L-shaped groove enclose the optical fiber in a closed space, ensuring stable deformation of the fiber and thereby ensuring consistent beam quality from the laser.

Figure 1:
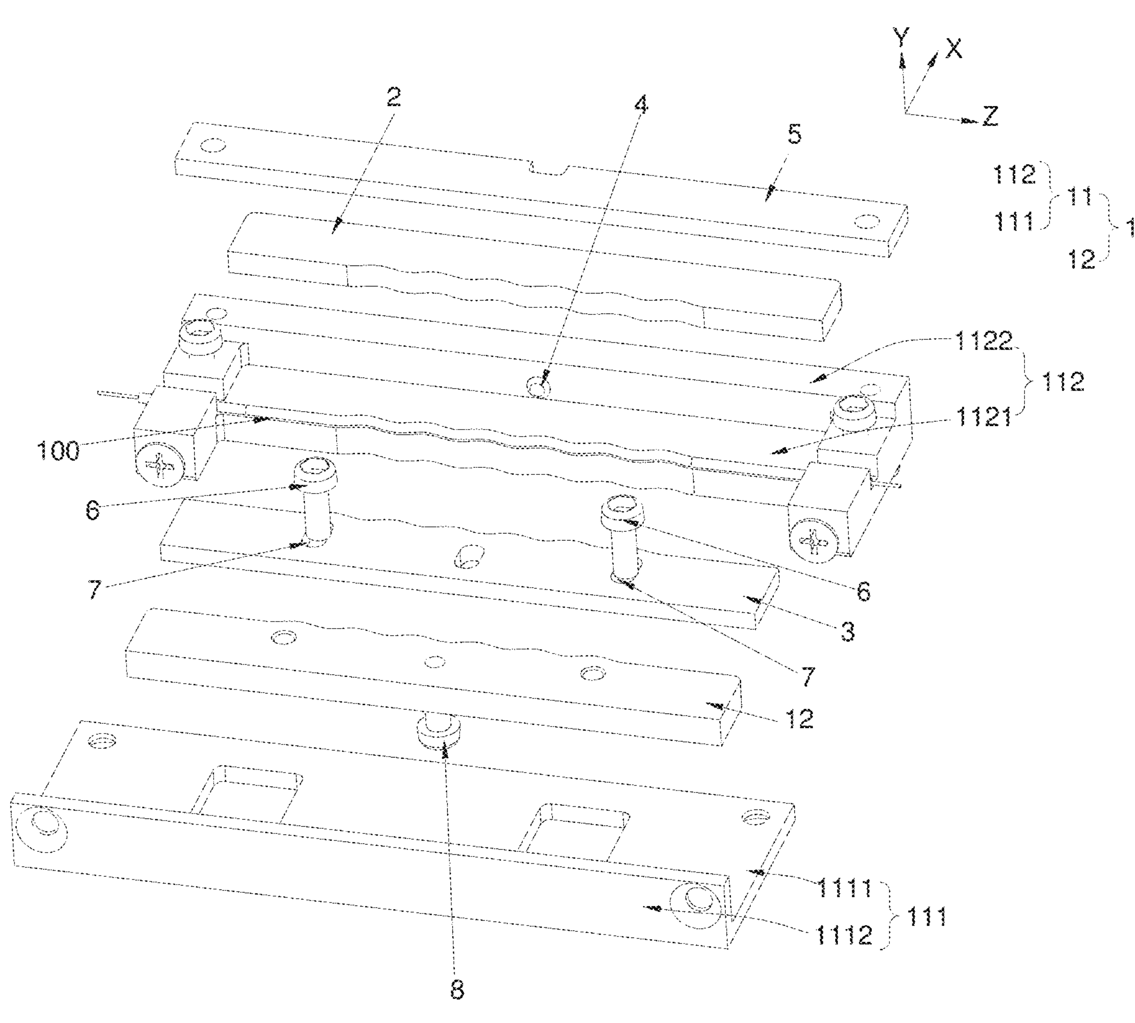
FIG. 1 is a schematic exploded view of a mode scrambler according to an embodiment of the present application.
Figure 2:
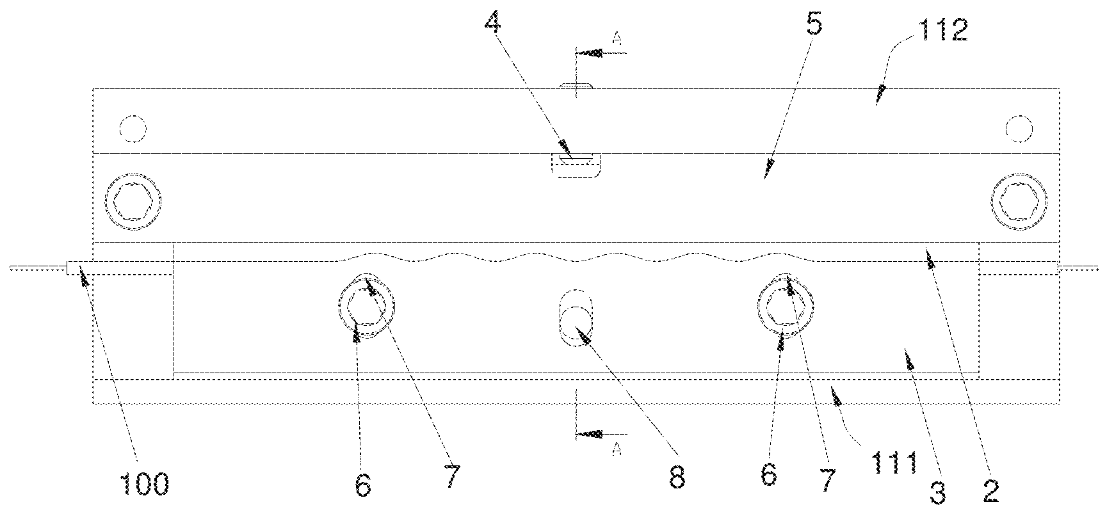
FIG. 2 is a schematic top view of the mode scrambler according to an embodiment of the present application.
Figure 3:
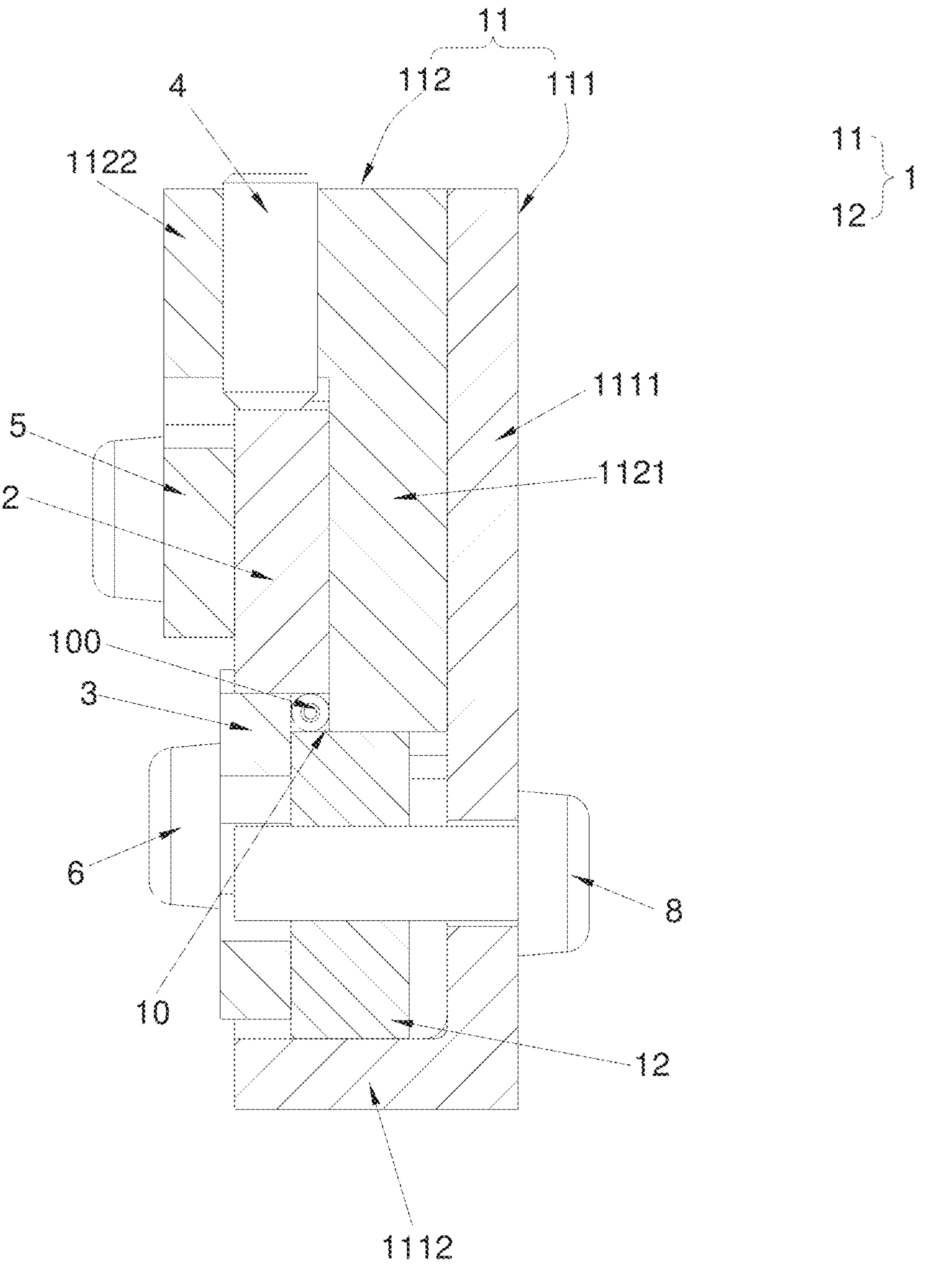
FIG. 3 is a cross-sectional view from a direction of A-A in FIG. 2.
Figure 4:
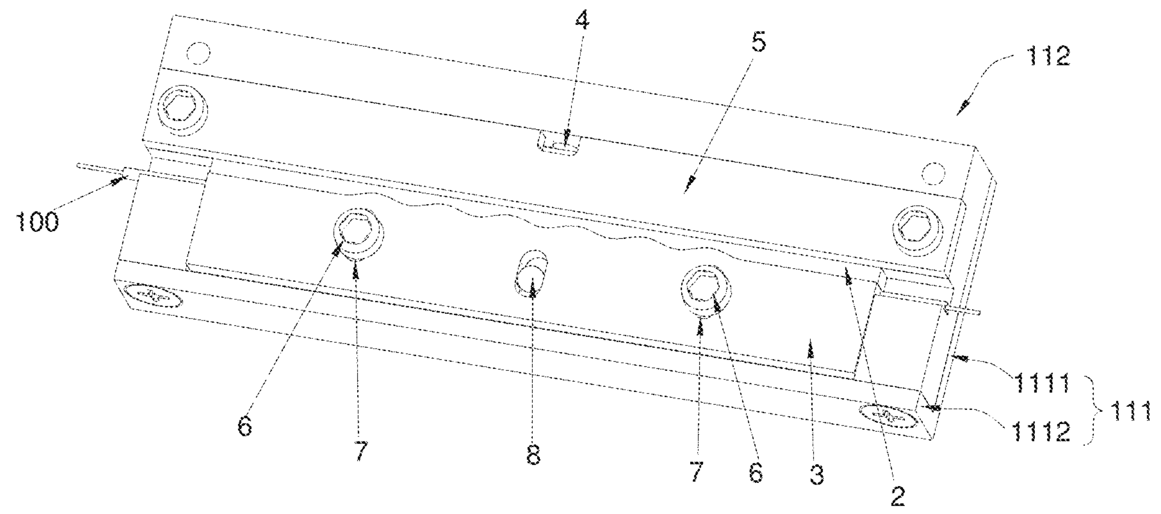
FIG. 4 is a schematic structural view of the mode scrambler from a first perspective according to an embodiment of the present application.
Figure 5:
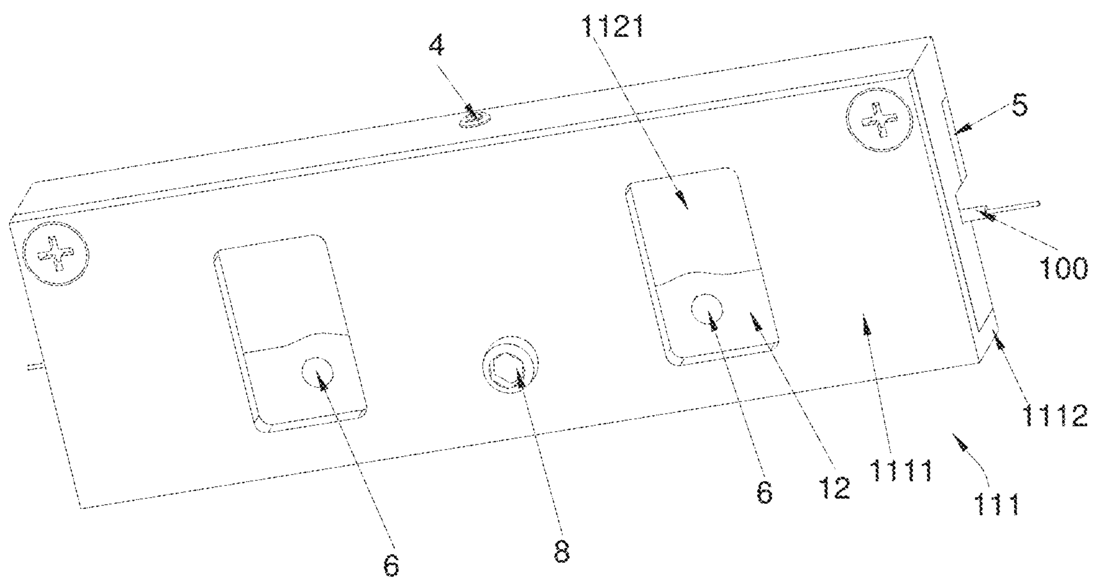
FIG. 5 is a schematic structural view of the mode scrambler from a second perspective according to an embodiment of the present application.

The realization of the purpose, functional characteristics and advantages of the present application will be further described with reference to the attached drawings in combination with embodiments.

DETAILED DESCRIPTION OF THE EMBODIMENTS

For the realization of the purpose, functional characteristics and advantages of the present application being more clear, the technical solutions of embodiments of the present application will be clearly and completely described with reference to the drawings in the embodiments of the present application. Obviously, the described embodiments are only some rather than all of the embodiments of the present application. The components of the embodiments of the present application, as described and illustrated in the accompanying drawings, can typically be provided and designed in various different configurations.

Therefore, the detailed description of the embodiments of the present application provided in the drawings is not intended to limit the scope of the claimed application but merely represents selected embodiments of the application. Based on the embodiments in the present application, all other embodiments obtained by those skilled in the art without creative efforts fall within the scope of protection of the present application.

It should be noted that similar reference numbers and letters in the following drawings indicate similar items, and once an item is defined in one drawing, it does not need to be further defined and explained in subsequent drawings.

In the description of the present application, it should be noted that the terms “upper”, “lower”, “left”, “right”, “vertical”, “horizontal”, “inner”, “outer” and other similar terms indicating directions or positional relationships are based on the directions or positional relationships shown in the drawings or the conventional placement of the invention product during use. These terms are merely for the convenience of describing the present application and simplifying the description, and are not intended to indicate or imply that the referred device or element must have a specific orientation, or be constructed, and operated in a specific orientation. Therefore, these terms should not be construed as limitations on the present application. Furthermore, terms such as “first”, “second”, and “third” are used solely for descriptive purposes and should not be understood as indicating or implying relative importance. In the present application, unless otherwise specified, “multiple” means two or more.

In the description of the present application, it should also be noted that unless otherwise explicitly specified or limited, the terms “provide” and “connect” should be interpreted broadly. For example, it can mean a fixed connection, a detachable connection, or an integral connection; it can be a mechanical connection or an electrical connection. Those skilled in the art can understand the specific meanings of these terms in the present application based on specific situations.

In the present application, unless otherwise explicitly specified or limited, the first feature being “above” or “below” the second feature may include the first feature and second features being in direct contact, or the first feature and second features not being in direct contact but in contact through additional features between them. Moreover, the first feature being “above”, “upper”, and “on” the second feature includes the first feature being directly or obliquely above the second feature, or merely indicating that the first feature is at a higher horizontal level than the second feature. The first feature being “below”, “lower”, and “under” the second feature includes the first feature being directly or obliquely below the second feature, or merely indicating that the first feature is at a lower horizontal level than the second feature.

The embodiments of the present application are described in detail below. Examples of these embodiments are illustrated in the accompanying drawings, where the same or similar reference numerals indicate the same or similar elements or elements having the same or similar functions throughout. The embodiments described below with reference to the accompanying drawings are exemplary and are intended solely to explain the present application and should not be construed as limiting the present application.

By using a mechanical mode scrambler to squeeze the optical fiber, the laser can emit a suitable beam quality. Since the material of the mode scrambler is aluminum alloy, the direct extrusion of metal causes the optical fiber to be easily damaged, so a layer of rubber tube is sleeved outside the optical fiber.

Because the inner diameter of the rubber tube outside the optical fiber is large, the optical fiber has no position constraint in its radial direction. As a result, after the optical fiber is squeezed, the quality of the laser beam at the laser emission point is uncontrollable. In order to solve the above problem, as shown in FIG. 1 to FIG. 5, in an embodiment, the present application provides a mode scrambler, which includes a fastening connection component 1, a first translation plate 2, and second translation plate 3. The fastening connection component 1 is provided with an L-shaped groove 10 for placing an optical fiber 100, and a vertical surface of the L-shaped groove 10 is a sinusoidal surface. The sinusoidal surface is provided along a length direction of the optical fiber 100.

The first translation plate 2 and the second translation plate 3 are both provided on the fastening connection component 1. The first translation plate 2 is configured to reciprocate relatively to the fastening connection component 1 along a radial direction of the optical fiber 100, and the second translation plate 3 is configured to reciprocate relatively to the fastening connection component 1 in a vertical direction A surface of the first translation plate 2 contacting the optical fiber 100 is a sinusoidal surface, and the sinusoidal surface of the first translation plate 2 and the sinusoidal surface of the L-shaped groove 10 are provided on two opposite sides of the optical fiber 100.

The second translation plate 3 is configured to press against a top of the optical fiber 100 and is in close contact with a part of the sinusoidal surface of the first translation plate 2.

The optical fiber 100 is enclosed among the fastening connection component 1, the first translation plate 2 and the second translation plate 3.

In this embodiment, the horizontal direction and the vertical direction both refer to the placement of the pattern scrambler during actual operation, that is, the X direction as shown in FIG. 1 represents the horizontal direction, and the Y direction represents the vertical direction.

In this embodiment, the fastening connection component 1 is provided with an L-shaped groove 10 for placing the optical fiber 100. The surface of the L-shaped groove 10 in the vertical direction is a sinusoidal surface, and a surface of the first translation 2 contacting the optical fiber 100 is a sinusoidal surface, thereby acting on both sides of the optical fiber 100. The first translation plate 2 moves along the radial direction of the optical fiber 100 to clamp the optical fiber 100. Under the combined action of the L-shaped groove 10 and the first translation plate 2, the optical fiber 100 undergoes sinusoidal deformation when clamped, which ensures that during mass production of lasers, the beam emitted by the laser remains controlled within the same range and maintains consistency after the optical fiber 100 is clamped by the mode scrambler.

In addition, the second translation plate 3 is connected to the fastening connection component 1. The second translation plate 3 is in close contact with a part of the sinusoidal surface of the first translation plate 2. The second translation plate second 3 is abutted against the top of the optical fiber 100. At this time, the first translation plate 2, the second translation plate 3 and the L-shaped groove 10 seal the optical fiber 100 in the closed space formed, so that the deformation produced by the optical fiber 100 is stable, thereby ensuring that the beam generated by the laser is basically the same.

The first translation plate 2 fine-tunes the radial displacement along the optical fiber 100 in the horizontal plane, and the second translation plate 3 fine-tunes the vertical displacement, so that the deformation amount of the optical fiber 100 after passing through the mode scrambler is controllable. This results in suitable beam quality.

In one embodiment, the first translation plate 2 is connected to the fastening connection component 1 through a first adjustment member 4 which is provided on the side surface of the fastening connection component 1. Through the first adjustment member 4 provided on the side surface of the fastening connection component 1, the first adjustment member 4 drives the first translation plate 2 to reciprocate in the radial direction of the optical fiber 100 in the horizontal plane, thereby achieving a simple structure and being easy to implement.

In this embodiment, a threaded hole is provided on the side of the fastening connection component 1, and the first adjustment member 4 is a jackscrew. The jackscrew is threadedly connected to the threaded hole and abutted against the first translation plate 2. The jackscrew has a simple structure and is installed in the threaded hole. The structure is small in size and the overall structure is compact.

In other embodiments, a threaded hole is provided on the side surface of the fastening connection component 1, the first adjustment member 4 is a screw, the screw is threadedly connected in the threaded hole, and one end of the screw is abutted against the first translation plate 2.

In addition to the position of the first adjustment member 4 in the fastening connection component 1, the first adjustment member 4 can also be provided at the bottom of the fastening connection component 1. Specifically, a first strip hole is opened at the bottom of the fastening connection component 1. The first strip hole is provided along the radial direction of the optical fiber 100. The first adjustment member 4 is a screw, and the screw passes through the first strip hole to be threadedly connected to the first translation plate 2. The screw drives the first translation plate 2 to move. When the position adjustment of the first translation plate 2 is completed, the screw tightly connects the first translation plate 2 and the fastening connection component 1.

In one embodiment, the pattern scrambler further includes a limiting plate 5. The limiting plate 5 is provided on the fastening connection component 1 and is pressed above the first translation plate 2.

Since the above-mentioned first translation plate 2 is provided on the fastening connection component 1, in order to prevent the first translation plate 2 from changing its position in the vertical direction, a limiting plate 5 is provided on the first translation plate 2, to compress the first translation plate 2.

In one embodiment, the fastening connection component 1 includes a connection assembly 11 and a support plate 12. An L-shaped groove 10 is formed between the support plate 12 and the connection assembly 11. The support plate 12 and the first translation plate 2 are provided on two opposite sides of the optical fiber 100. The contact surface between the support plate 12 and the optical fiber 100 is a sinusoidal surface.

The second translation plate 3 is provided above the support plate 12, and the support plate 12 can drive the second translation plate 3 to reciprocate in the vertical direction.

The support plate 12 is placed on the connection assembly 11 and forms an L-shaped groove 10 with the connection assembly 11. The support plate 12 and the first translation plate 2 are provided on two opposite sides of the optical fiber 100. A side surface of the support plate 12 and a side surface of the first translation plate 2 are both sinusoidal surfaces. A part of the side surfaces of the first translation plate 2 and the support plate 12 press the optical fiber 100 provided therebetween.

The L-shaped groove 10 formed by the connection assembly 11 and the support plate 12 is used. The side surface of the support plate 12 is used as a sinusoidal surface to squeeze the optical fiber 100 to undergo sinusoidal deformation. The structure is simple and easy to assemble. The support plate 12 can also support the second translation plate 3 thereon to move in the vertical direction to compress the optical fiber 100 in the vertical direction.

In order to reduce the difficulty of processing, the entire side surface of the above-mentioned first translation plate 2 is a sinusoidal surface, and the side surface of the second translation plate 3 contacting the first translation plate 2 is also a sinusoidal surface. The two sinusoidal surfaces may co-operate after contacting with each other.

As for the specific structure of the above-mentioned second translation plate 3 moving in the vertical direction, a second adjustment member 8 is also included. The second adjustment member 8 is connected to the support plate 12. The second adjustment member 8 may drive the support plate 12 and the second translation plate 3 move in the vertical direction.

Specifically, the second adjustment member 8 is a screw. The screw passes through the connection assembly 11 and is connected to the bottom of the second translation plate 3. By rotating the screw, the second translation plate 3 moves vertically along with the support plate 12 to adjust the position of the second translation plate 3 squeezing the optical fiber 100 in the vertical direction.

In one embodiment, the second translation plate 3 is provided with an adjustment hole 7. The second translation plate 3 is configured to reciprocate along the radial direction of the optical fiber 100 in the horizontal plane through the adjustment hole 7. The second translation plate 3 is tightly connected to the support plate 12 through a fastener 6 passing through the adjustment hole 7.

An adjustment hole 7 is opened on the second translation plate 3. The fastener 6 passes through the adjustment hole 7 and is connected to the support plate 12. When the fastener 6 is not tightened, the second translation plate 3 can reciprocate along the adjustment hole 7. The second translation plate 3 reciprocates along the radial direction of the optical fiber 100 in the horizontal plane to compress or loosen the optical fiber 100.

In one embodiment, the adjustment hole 7 is a strip hole. The long axis of the strip hole is provided along the radial direction of the optical fiber 100. The fastener 6 passes through the strip hole and is tightly connected to the support plate 12.

By setting the strip hole, the second translation plate 3 can move in the radial direction of the optical fiber 100 in the horizontal plane. After the position of the second translation plate 3 is adjusted in place, the second translation plate 3 is fastened to the support plate 12 through the fastener 6. By using the support plate 12 and the adjustment hole 7 defined on the second translation plate 3, the second translation plate 3 can be adjusted in the vertical direction and in the radial direction of the optical fiber 100 on the horizontal plane, thereby squeezing the optical fiber 100 better, so that the laser emits a suitable laser beam.

In one embodiment, the connection assembly 11 includes a first connection plate 111 and a second connection plate 112. The first connection plate 111 and the second connection plate 112 are connected to form a groove.

The second connection plate 112 includes a second bottom plate portion 1121. The support plate 112 is provided in the groove. The second bottom plate portion 1121 is a partial bottom of the groove. The support plate 12 is provided above the bottom of the first connection plate 111, the height of the support plate 12 is higher than the height of the second bottom plate portion 1121, and the side surface of the second bottom plate portion 1121 is partially in contact with one side surface of the support plate 12 to form the L-shaped groove 10.

Specifically, because the optical fiber 100 is located in the L-shaped groove 10, the surface of the support plate 12 that contacts the optical fiber 100 is a sinusoidal surface. Since this surface is also in contact with the side surface of the second bottom plate portion 1121, therefore, the side surface of the second bottom plate portion 1121 is also a sinusoidal surface, and the sinusoidal surface of the support plate 12 and the sinusoidal surface of the second bottom plate portion 1121 are in contact with each other and fit together.

The entire side surface of the support plate 12 is processed into a sinusoidal surface, which is simple to process. When the support plate 12 reciprocates in the vertical direction, the sinusoidal surface of the support plate 12 and the sinusoidal surface of the second bottom plate portion 1121 are always in contact with each other and fit together, playing a positioning and guiding role for the second translation plate 3 to reciprocate in the vertical direction.

In one embodiment, the first connection plate 111 includes a first bottom plate portion 1111 and a first side plate portion 1112 that are connected to each other in an L shape. The first bottom plate portion 1111 is provided below the second connection plate 112, the first bottom plate portion 1111 is fixedly connected to the second bottom plate portion 1121. The support plate 12 is provided above the first bottom plate portion 1111. The support plate 12 is provided opposite to the second bottom plate portion 1121, the sinusoidal surface of the support plate 12 is in contact with the sinusoidal surface of the first bottom plate portion 1111, and the surface on the other side of the support plate 12 can be in contact with an inner side of the first side plate portion 1112. The inner wall of the first side plate portion 1112 is used to position the support plate 12. During the reciprocating movement of the support plate 12 in the vertical direction, the first side plate portion 1112 may guide the inner wall of the support plate 12. In other embodiments, the other side surface of the support plate 12 may not be in contact with the inner wall of the first side plate portion 1112. A slide groove is provided on the inner wall of the first side plate portion 1112, and a slider that cooperates with the slide groove is provided on the other side of the support plate 12 to position the support plate 12.

In other embodiments, the first bottom plate portion 1111 of the first connection portion can be an integral structure with the above-mentioned second bottom plate portion 1121.

In one embodiment, the second connection plate 112 further includes a U-shaped side plate portion 1122 connected to the second bottom plate portion 1121, and the first side plate portion 1112 can be connected to the U-shaped side plate portion 1122 to form the side wall of the groove. The first translation plate 2 is provided on the second bottom plate portion 1121, the first adjustment member 4 is provided on the U-shaped side plate portion 1122, and the limiting plate 5 can be tightly connected to the U-shaped side plate portion 1122.

The U-shaped side plate portion 1122 includes a side plate and end plates located at both ends of the side plate. One side of the second bottom plate portion 1121 is connected to the inner wall of the side plate, and both ends of the second bottom plate portion 1121 are connected to one end plate respectively. An optical fiber slot is provided on the end plate to facilitate the placement of optical fiber 100.

The above-mentioned threaded hole is opened on the side plate, and a jackscrew is installed in the threaded hole to fine-tune the position of the first translation plate 2.

Obviously, the above embodiments of the present application are merely illustrative examples provided to clearly explain the present application and are not intended to limit the embodiments of the present application. Those skilled in the art can make other variations or modifications based on the above description. It is neither necessary nor possible to exhaustively enumerate all embodiments. Any modifications, equivalent substitutions, and improvements made within the spirit and principles of the present application should be included within the scope of protection of the claims of the present application.

What is claimed is:

1. A mode scrambler, comprising:

a fastening connection component;

a first translation plate; and a second translation plate;

wherein the fastening connection component is provided with an L-shaped groove for placing an optical fiber; a vertical surface of the L-shaped groove is a sinusoidal surface, and the sinusoidal surface is provided along a length direction of the optical fiber;

the first translation plate and the second translation plate are both connected to the fastening connection component; the first translation plate is configured to reciprocate relatively to the fastening connection component along a radial direction of the optical fiber, and the second translation plate is configured to reciprocate relatively to the fastening connection component in a vertical direction;

a surface of the first translation plate contacting the optical fiber is a sinusoidal surface, and the sinusoidal surface of the first translation plate and the sinusoidal surface of the L-shaped groove are provided on two opposite sides of the optical fiber;

the second translation plate is abutted against a top of the optical fiber and is in close contact with a part of the sinusoidal surface of the first translation plate; and the optical fiber is enclosed among the fastening connection component, the first translation plate and the second translation plate.

2. The mode scrambler of claim 1, wherein the first translation plate is connected to the fastening connection component through a first adjustment member, and the first adjustment member is provided on a side surface of the fastening connection component.

3. The mode scrambler of claim 2, wherein a threaded hole is provided on the side surface of the fastening connection component, the first adjustment member is a jackscrew, and the jackscrew is threadedly connected to the threaded hole and abutted against the first translation plate.

4. The mode scrambler of claim 1, further comprising:

a limiting plate provided on the fastening connection component and pressed above the first translation plate.

5. The mode scrambler of claim 4, wherein the fastening connection component comprises a connection assembly and a support plate provided on the connection assembly;

the support plate and the first translation plate are provided on two opposite sides of the optical fiber; a surface of the support plate contacting the optical fiber is the sinusoidal surface, and the L-shaped groove is formed between the support plate and the connection assembly; and the second translation plate is provided above the support plate, and the support plate is configured to drive the second translation plate to reciprocate in the vertical direction.

6. The mode scrambler of claim 5, wherein the second translation plate is provided with an adjustment hole; the second translation plate is configured to reciprocate along the radial direction of the optical fiber in a horizontal plane through the adjustment hole, and the second translation plate is tightly connected to the support plate through a fastener passing through the adjustment hole.

7. The mode scrambler of claim 6, wherein the adjustment hole is a strip hole, a long axis of the strip hole is provided along the radial direction of the optical fiber, and the fastener is configured to pass through the strip hole to tightly connect to the support plate.

8. The mode scrambler of claim 5, wherein the connection assembly comprises a first connection plate and a second connection plate, and the first connection plate and the second connection plate are connected to form a groove; and the second connection plate comprises a second bottom plate portion, and the support plate is provided in the groove and above a bottom of the first connection plate; a part of a side surface of the second bottom plate portion is in contact with a side surface of the support plate to form the L-shaped groove.

9. The mode scrambler of claim 8, wherein the first connection plate comprises a first bottom plate portion and a first side plate portion, and the first bottom plate portion and the first side plate portion are connected to each other to form an L shape; the first bottom plate portion is provided below the second connection plate; the support plate is provided above the first bottom plate portion, and the other side surface of the support plate is in contact with an inner side of the first side plate portion.

10. The mode scrambler of claim 9, wherein the second connection plate further comprises a U-shaped side plate portion connected to the second bottom plate portion, and the first side plate portion is tightly connected to the U-shaped side plate portion to form a side wall of the groove; the first translation plate is provided above the second bottom plate portion, and the limiting plate is tightly connected to the U-shaped side plate portion.

* * * * *